US012738208B2

(12) United States Patent
Deng et al.

(10) Patent No.: US 12,738,208 B2
(45) Date of Patent: Sep. 15, 2026

(54) PIXEL CIRCUIT

(71) Applicant: AUO Corporation, Hsinchu City (TW)

(72) Inventors: Ming-Yang Deng, Hsinchu City (TW); Che-Chia Chang, Hsinchu City (TW); Ming-Hung Chuang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/256,174

(22) Filed: Jul. 1, 2025

(65) Prior Publication Data

US 2026/0188186 A1 Jul. 2, 2026

(30) Foreign Application Priority Data

Dec. 27, 2024 (TW) ................................ 113151336

(51) Int. Cl.
*G09G 3/32* (2016.01)
*G09G 3/20* (2006.01)

(52) U.S. Cl.
CPC ............ *G09G 3/32* (2013.01); *G09G 3/2011* (2013.01); *G09G 3/2018* (2013.01); (Continued)

(58) Field of Classification Search
CPC ......... G09G 3/2081; G09G 3/32–3291; G09G 2300/0809; G09G 2300/0852; G09G 2320/0233; G09G 2320/0633; G09G 2320/064; G09G 2320/0238; G09G 2310/0259; G09G 2310/066; G09G 2310/08
See application file for complete search history.

(56) References Cited

U.S. PATENT DOCUMENTS

2015/0035869 A1* 2/2015 Mori ........................ G09G 3/36 345/89
2022/0114951 A1* 4/2022 Chang ...................... G09G 3/32
(Continued)

FOREIGN PATENT DOCUMENTS

CN 112669763 A * 4/2021
TW I722955 3/2021
TW I761037 4/2022

OTHER PUBLICATIONS

English Translation for CN112669763 (Year: 2021).*

*Primary Examiner* — Roberto W Flores
(74) *Attorney, Agent, or Firm* — JCIPRNET

(57) ABSTRACT

A pixel circuit includes a light-emitting diode (LED), a first driving transistor, a second driving transistor, a pulse amplitude modulation circuit, and a pulse width modulation circuit. The first driving transistor has a first terminal, a control terminal receiving an amplitude control signal, and a second terminal. The second driving transistor has a first terminal coupled to the second terminal of the first driving transistor, a control terminal receiving a width control signal, and a second terminal coupled to an anode of the LED. A channel polarity of the second driving transistor is different from that of the first driving transistor. The pulse amplitude modulation circuit provides the amplitude control signal based on an emission signal and an amplitude data voltage. The pulse width modulation circuit provides the width control signal based on the emission signal, a swing signal, and a width data voltage.

14 Claims, 8 Drawing Sheets

(52) U.S. Cl.
CPC ............... *G09G 2300/0819* (2013.01); *G09G 2300/0852* (2013.01); *G09G 2300/0861* (2013.01); *G09G 2310/066* (2013.01); *G09G 2320/0214* (2013.01); *G09G 2320/0233* (2013.01); *G09G 2320/0693* (2013.01); *G09G 2330/12* (2013.01)

(56) References Cited

U.S. PATENT DOCUMENTS

| | | | | |
|---|---|---|---|---|
| 2023/0012711 | A1* | 1/2023 | Kim | G09G 3/32 |
| 2023/0120477 | A1* | 4/2023 | Hwang | G09G 3/2081 |
| 2024/0135868 | A1* | 4/2024 | Lee | G09G 3/2007 |
| 2024/0212591 | A1* | 6/2024 | Kwon | G09G 3/3233 |
| 2025/0037659 | A1* | 1/2025 | Xu | G09G 3/3233 |
| 2026/0031023 | A1* | 1/2026 | Pyun | G09G 3/32 |

* cited by examiner

PIXEL CIRCUIT

CROSS-REFERENCE TO RELATED APPLICATION

This application claims the priority benefit of Taiwan application serial no. 113151336, filed on Dec. 27, 2024. The entirety of the above-mentioned patent application is hereby incorporated by reference herein and made a part of this specification.

BACKGROUND

Technical Field

The disclosure relates to a pixel circuit, and in particular, relates to a self-emitting pixel circuit.

Description of Related Art

At present, organic light-emitting diodes (OLED), mini light-emitting diodes (Mini LED), and micro light-emitting diodes (Micro LED) are the main components used in self-emitting display panels. However, the emission brightness curves of the mini light-emitting diodes and the micro light-emitting diodes are different from those of the organic light-emitting diodes. That is, when operated at the same brightness, the emission efficiency points of the mini light-emitting diodes and the micro light-emitting diodes will change, so poor emission efficiency is provided and power consumption is high.

For micro light-emitting diodes (uLED), compared to the pulse amplitude modulation (PAM) mode, the pulse width modulation (PWM) mode has better color shift as well as relatively better power consumption performance. The pulse width modulation (PWM) operates based on a sawtooth swing signal. However, due to coupling between wirings (i.e., crosstalk (X-talk)), the swing signals received by pixel circuits in the same row may affect one another. That is, when there is an excessively large grayscale difference displayed in the same row of pixel circuits, the display effect of the pixel circuits will be affected by the swing signal that varies due to the crosstalk. Although this problem can be improved by increasing the system high voltage and the data voltage for low grayscale, contrast becomes another problem.

In addition, at low grayscale (LGL, e.g., grayscale 0 to 32), the gate-source voltage (Vsg) of the driving transistor used for pulse width modulation affects the amplitude of the driving current flowing through the light-emitting diode. Further, due to variations in the forward voltage (Vf) of the light-emitting diode, different amplitudes of the driving current lead to uneven brightness at low grayscale, and screen sparkling thus occurs. Although it may be possible to accelerate the turning on of the driving transistor by adjusting the voltage level of the grayscale data voltage, this also causes the driving current to increase.

SUMMARY

The disclosure provides a pixel circuit capable of improving the crosstalk problem among pixel circuits and the screen sparkling problem when the display panel displays a low grayscale level.

The disclosure provides a pixel circuit including a light-emitting diode, a first driving transistor, a second driving transistor, a pulse amplitude modulation circuit, and a pulse width modulation circuit. The light-emitting diode has an anode and a cathode receiving a system low voltage. The first driving transistor has a first terminal, a control terminal receiving an amplitude control signal, and a second terminal. The second driving transistor has a first terminal coupled to the second terminal of the first driving transistor, a control terminal receiving a width control signal, and a second terminal coupled to the anode of the light-emitting diode. A channel polarity of the second driving transistor is different from that of the first driving transistor. The pulse amplitude modulation circuit is coupled to the first terminal, the control terminal, and the second terminal of the first driving transistor and receives a first system high voltage, an emission signal, and an amplitude data voltage, so as to provide the first system high voltage to the first terminal of the first driving transistor based on the emission signal and provide the amplitude control signal based on the emission signal and the amplitude data voltage. The pulse width modulation circuit is coupled to the control terminal of the second driving transistor and receives a second system high voltage, the emission signal, a swing signal, and a width data voltage, so as to provide the width control signal based on the second system high voltage, the emission signal, the swing signal, and the width data voltage.

The disclosure also provides a pixel circuit including a light-emitting diode, a first driving transistor, a second driving transistor, a pulse amplitude modulation circuit, and a pulse width modulation circuit. The light-emitting diode has an anode and a cathode receiving a system low voltage. The first driving transistor controlled to be turned on by an amplitude control signal. The second driving transistor controlled to be turned on by a width control signal, wherein the first driving transistor and the second driving transistor are coupled in series to the anode of the light-emitting diode, and a channel polarity of the second driving transistor is different from that of the first driving transistor. The pulse amplitude modulation circuit receiving a first system high voltage, an emission signal, and an amplitude data voltage, so as to provide the first system high voltage to the first driving transistor based on the emission signal and to provide the amplitude control signal based on the emission signal and the amplitude data voltage. The pulse width modulation circuit receiving a second system high voltage, the emission signal, a swing signal, and a width data voltage, so as to provide the width control signal based on the second system high voltage, the emission signal, the swing signal, and the width data voltage.

To sum up, in the pixel circuit of the embodiment of the disclosure, the second driving transistor has a channel polarity different from that of the first driving transistor, for example, so that the operation of the second driving transistor is inverted relative to the first driving transistor. That is, the second driving transistor is initially turned off and is turned on only when the width control signal rises to exceed the threshold voltage of the second driving transistor. In this way, the surge generated by the swing signal due to crosstalk does not affect the turning-on time of the second driving transistor, so that the crosstalk problem among pixel circuits when the display panel displays a low grayscale level is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Unless otherwise defined, all terms (including technical and scientific terms) used herein have the same meaning as commonly understood by a person having ordinary skill in the art. It will be further understood that, terms such as those defined in commonly used dictionaries should be interpreted as having a meaning that is consistent with their meaning in the context of the related art, and these terms are not to be construed in an idealized or excessively formal sense unless explicitly defined as such herein.

It should be understood that although the terms “first”, “second”, “third”, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Therefore, a “first element”, “component”, “region”, “layer”, or “section” discussed below could be termed a second element, component, region, layer, or section without departing from the teachings herein.

The terms used herein is for the purpose of describing particular embodiments only and are not intended to be limiting. As used herein, the singular forms “a”, “an”, and “the” are intended to include the plural forms as well, including “at least one,” unless the context clearly indicates otherwise. “Or” means “and/or”. The term “and/or” used herein includes any or a combination of one or more of the associated listed items. It will be further understood that the terms “comprises” and/or “comprising”, when used in this specification, specify the presence of stated features, regions, integers, steps, operations, elements, and/or components, but do not preclude the presence or addition of one or more other features, regions, integers, steps, operations, elements, components, and/or groups thereof.

Figure 1A:
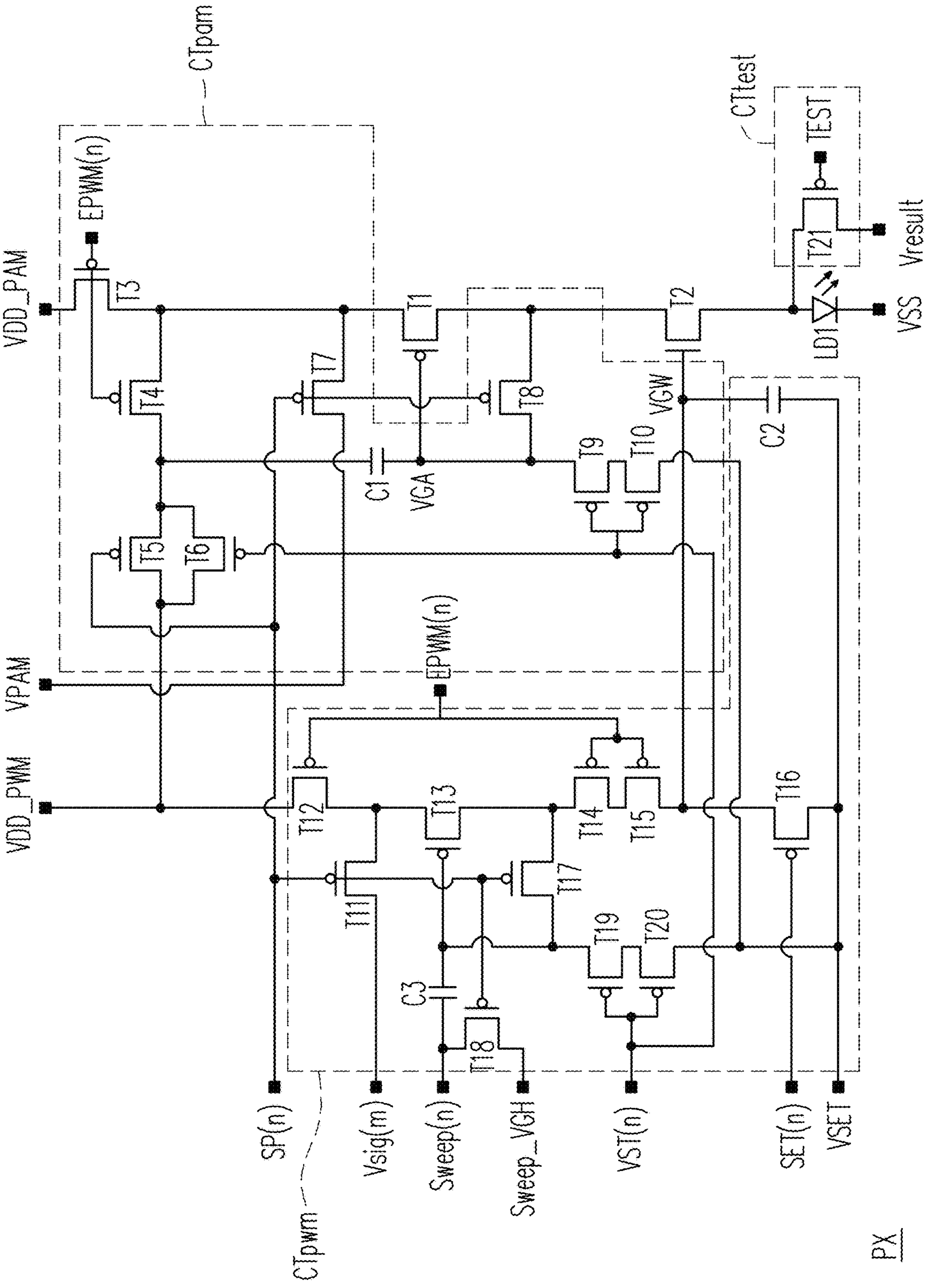
FIG. 1A is a schematic diagram of a system of a pixel circuit according to an embodiment of the disclosure.

FIG. 1A is a schematic diagram of a system of a pixel circuit according to an embodiment of the disclosure. Referring to FIG. 1A, in this embodiment, a pixel circuit PX includes at least a light-emitting diode LD1, a transistor T1 (corresponding to a first driving transistor), a transistor T2 (corresponding to a second driving transistor), a pulse amplitude modulation circuit CTpam, and a pulse width modulation circuit CTpwm. The light-emitting diode LD1 is, for example, a micro light-emitting diode, but the embodiments of the disclosure are not limited thereto.

The light-emitting diode (LD1) has an anode and a cathode receiving a system low voltage VSS. The transistor T1 has a first terminal, a control terminal receiving an amplitude control signal VGA, and a second terminal. The transistor T2 has a first terminal coupled to the second terminal of the transistor T1, a control terminal receiving a width control signal VGW, and a second terminal coupled to the anode of the light-emitting diode LD1. A channel polarity of the transistor T2 is different from that of the transistor T1, for example, the transistor T1 is a P-type transistor, but the transistor T2 is an N-type transistor, but the embodiments of the disclosure are not limited thereto. That is, the transistors T1 and T2 are serially coupled to the anode of the light-emitting diode LD1.

The pulse amplitude modulation circuit CTpam is coupled to the first terminal, the control terminal, and the second terminal of the transistor T1 and receives a system high voltage VDD_PAM (corresponding to a first system high voltage), an emission signal EPWM(n), and an amplitude data voltage VPAM, so as to provide the system high voltage VDD_PAM to the first terminal of the transistor T1 based on the emission signal EPWM(n) and to provide the amplitude control signal VGA based on the emission signal EPWM(n) and the amplitude data voltage VPAM. The pulse width modulation circuit CTpwm is coupled to the control terminal of the transistor T2 and receives a system high voltage VDD_PWM (corresponding to a second system high voltage), the emission signal EPWM(n), a swing signal Sweep(n), and a grayscale data voltage Vsig(m) (corresponding to a width data voltage), so as to provide the width control signal VGW based on the system high voltage VDD_PWM, the emission signal EPWM(n), the swing signal Sweep(n), and the grayscale data voltage Vsig(m), where n and m are guide numbers and are independent of each other.

Figure 1B:
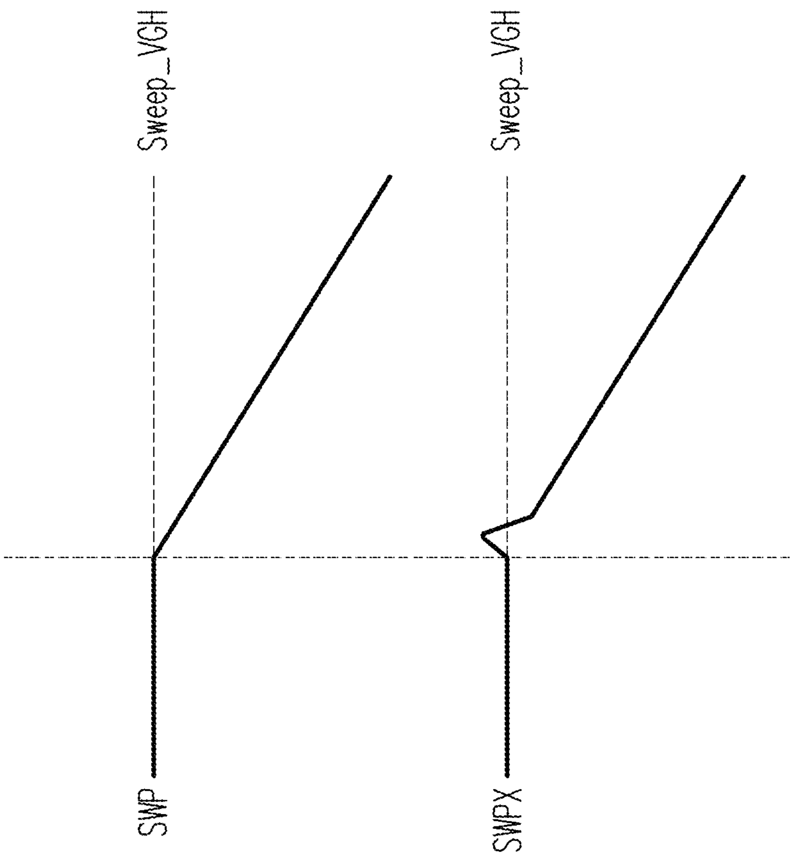
FIG. 1B is a schematic waveform graph of a swing signal of the pixel circuit according to an embodiment of the disclosure.

FIG. 1B is a schematic waveform graph of a swing signal of the pixel circuit according to an embodiment of the disclosure. Referring to FIG. 1A and FIG. 1B, in this embodiment, when the swing signal Sweep(n) as shown in a waveform SWP begins to decrease from a swing high voltage Sweep_VGH, the width control signal VGW responds to the swing signal Sweep(n) decreasing to a corresponding voltage level and begin to rise. At this time, if the transistor T2 is a P-type transistor, the transistor T2 will be turned on, enabling the light-emitting diode LD1 to emit light. If the swing signal Sweep(n) becomes as shown in a waveform SWPX due to crosstalk, it will cause the rising time of the width control signal VGW to be delayed, that is, the time for the light-emitting diode LD1 to emit light may be longer. Therefore, during the time of displaying a low grayscale screen, brightness of part of the pixel circuits PX may be excessively high due to crosstalk, and the display of the screen is thus affected.

Conversely, in this embodiment, taking the transistor T2 as an N-type transistor as an example, the transistor T2 is turned off first and is turned on only when the width control signal VGW rises above a threshold voltage of the transistor T2. That is, a surge generated by the swing signal Sweep(n) due to crosstalk does not affect the turning-on time of the transistor T2. In this way, the crosstalk problem among pixel circuits when the display panel displays low grayscale level may be improved.

Referring to FIG. 1A again, in this embodiment, the pulse amplitude modulation circuit CTpam includes transistors T3 to T10 (corresponding to the first transistor to an eighth transistor) and a capacitor C1 (corresponding to a first capacitor), where the transistors T3 to T10 are, for example, P-type transistors. The transistor T3 has a first terminal receiving the system high voltage VDD_PAM, a control terminal receiving the emission signal EPWM(n), and a second terminal coupled to the first terminal of the transistor T1. The transistor T4 has a first terminal, a control terminal receiving the emission signal EPWM(n), and a second terminal coupled to the first terminal of the transistor T1. The transistor T5 has a first terminal receiving the system high voltage VDD_PWM, a control terminal receiving a pixel setting signal SP(n), and a second terminal coupled to the first terminal of the transistor T4.

The transistor T6 has a first terminal receiving the system high voltage VDD_PWM, a control terminal receiving an initial voltage signal VST(n), and a second terminal coupled to the first terminal of the transistor T4. The transistor T7 has a first terminal receiving the amplitude data voltage VPAM, a control terminal receiving the pixel setting signal SP(n), and a second terminal coupled to the first terminal of the transistor T1. The capacitor C1 is coupled between the first terminal of the transistor T4 and the control terminal of the transistor T1 and is configured to provide the amplitude control signal VGA.

The transistor T8 has a first terminal coupled to the control terminal of the transistor T1, a control terminal receiving the pixel setting signal SP(n), and a second terminal coupled to the second terminal of the transistor T1. The transistor T9 has a first terminal coupled to the control terminal of the transistor T1, a control terminal receiving the pixel setting signal SP(n), and a second terminal. The transistor T10 has a first terminal coupled to the second terminal of the transistor T9, a control terminal receiving the pixel setting signal SP(n), and a second terminal receiving a setting voltage VSET.

In this embodiment, the pulse width modulation circuit CTpwm includes transistors T11 to T20 (corresponding to a ninth transistor to an eighteenth transistor) and capacitors C2 and C3 (corresponding to a second capacitor and a third capacitor), where the transistors T11 to T20 are, for example, P-type transistors. The capacitor C2 is coupled between the control terminal of the transistor T2 and the setting voltage VSET. The transistor T11 has a first terminal receiving the grayscale data voltage Vsig(m), a control terminal receiving the pixel setting signal SP(n), and a second terminal. The transistor T12 has a first terminal receiving the system high voltage VDD_PWM, a control terminal receiving the emission signal EPWM(n), and a second terminal coupled to the second terminal of the transistor T11.

The transistor T13 has a first terminal coupled to the second terminal of the transistor T11, a control terminal, and a second terminal. The capacitor C3 is coupled between the swing signal Sweep(n) and the control terminal of the transistor T13. The transistor T14 has a first terminal coupled to the second terminal of the transistor T13, a control terminal receiving the emission signal EPWM(n), and a second terminal. The transistor T15 has a first terminal coupled to the second terminal of the transistor T14, a control terminal receiving the emission signal EPWM(n), and a second terminal coupled to the control terminal of the transistor T2 and configured to provide the width control signal VGW.

The transistor T16 has a first terminal coupled to the control terminal of the transistor T2, a control terminal receiving a voltage setting signal SET(n), and a second terminal receiving the setting voltage VSET. The transistor T17 has a first terminal coupled to the control terminal of the transistor T13, a control terminal receiving the pixel setting signal SP(n), and a second terminal coupled to the second terminal of the transistor T13. The transistor T18 has a first terminal receiving the swing signal Sweep(n), a control terminal receiving the pixel setting signal SP(n), and a second terminal receiving the swing high voltage Sweep_VGH.

The transistor T19 has a first terminal coupled to the control terminal of the transistor T13, a control terminal receiving the initial voltage signal VST(n), and a second terminal. The transistor T20 has a first terminal coupled to the second terminal of the transistor T19, a control terminal receiving the initial voltage signal VST(n), and a second terminal receiving the setting voltage VSET.

In this embodiment, the pixel circuit PX further includes a test circuit CTtest coupled to the anode of the light-emitting diode LD1 and receiving a test circuit TEST, so as to provide a test result voltage Vresult based on the test circuit TEST. The test result voltage Vresult and the grayscale data voltage Vsig(m) may be transmitted through the same wiring (such as a data line), but the embodiments of the disclosure are not limited thereto.

In this embodiment, the test circuit CTtest includes a transistor T21 (corresponding to a nineteenth transistor), where transistor T21 is, for example, a P-type transistor. The transistor T21 has a first terminal coupled to the anode of the light-emitting diode LD1, a control terminal receiving the test circuit TEST, and a second terminal providing the test result voltage Vresult.

In this embodiment, the transistors T9 and T10 are shown as dual-gate types, but in other embodiments, the transistors T9 and T10 may be shown as single transistors. The transistors T14 and T15 are shown as dual-gate types, but in other embodiments, the transistors T14 and T15 may be shown as single transistors. The transistors T19 and T20 are shown as dual-gate types, but in other embodiments, the transistors T19 and T20 may be shown as single transistors. The embodiments of the disclosure are not limited thereto.

Figure 2:
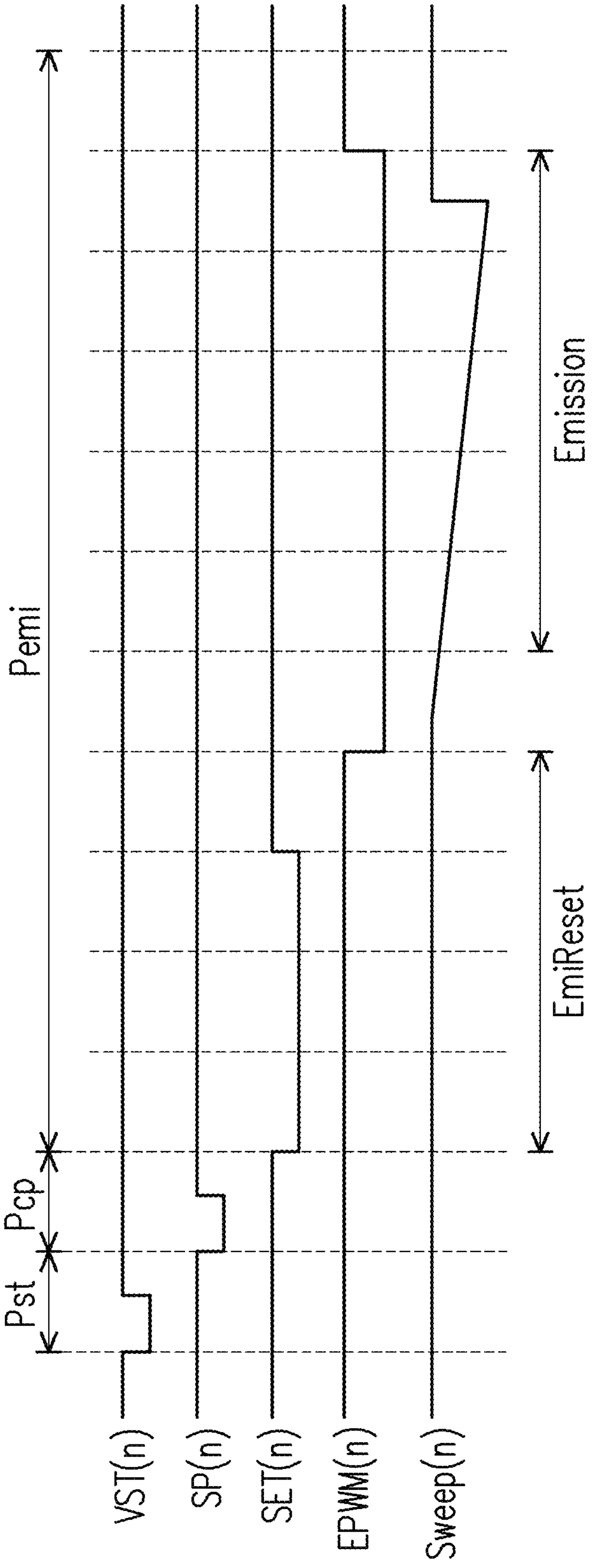
FIG. 2 is a schematic operation sequence diagram of the pixel circuit according to an embodiment of the disclosure.

FIG. 2 is a schematic operation sequence diagram of the pixel circuit according to an embodiment of the disclosure. Referring to FIG. 1A and FIG. 2, in this embodiment, a driving sequence of the pixel circuit PX is generally divided into a pixel initiation period Pst, a pixel compensation period Pcp, and a pixel emission period Pemi, where the pixel emission period Pemi may further include an emission reset period EmiReset and an emission driving period Emission.

Figure 3A:
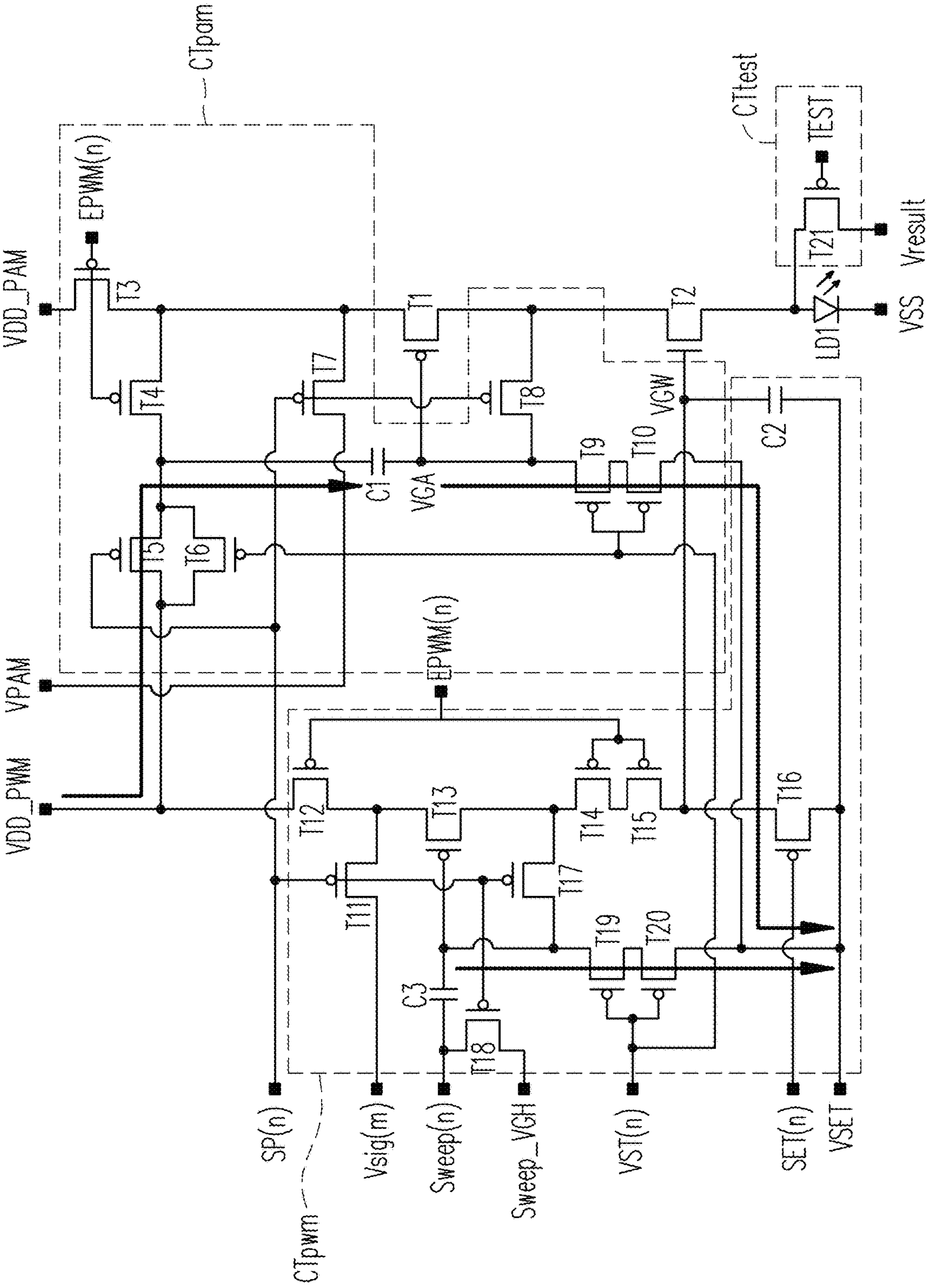
FIG. 3A is a schematic operation diagram of the pixel circuit during a pixel initiation period according to an embodiment of the disclosure.

FIG. 3A is a schematic operation diagram of the pixel circuit during a pixel initiation period according to an embodiment of the disclosure. Referring to FIG. 1A, FIG. 2, and FIG. 3A, during the pixel initiation period Pst, the initial voltage signal VST(n) is enabled (e.g., at a low voltage level), and the pixel setting signal SP(n), the voltage setting signal SET(n), the emission signal EPWM(n), and the swing signal Sweep(n) are disabled (e.g., at a high voltage level). At this time, the transistors T6, T9, T10, T19, and T20 are turned on, while the remaining transistors are not turned on. As such, the voltage across the capacitor C1 is the system high voltage VDD_PAM minus the setting voltage VSET, the voltage across the capacitor C2 is in an uncertain state, and the voltage across the capacitor C3 is the high voltage level of the swing signal Sweep(n) (i.e., the swing high voltage Sweep_VGH) minus the setting voltage VSET.

Figure 3B:
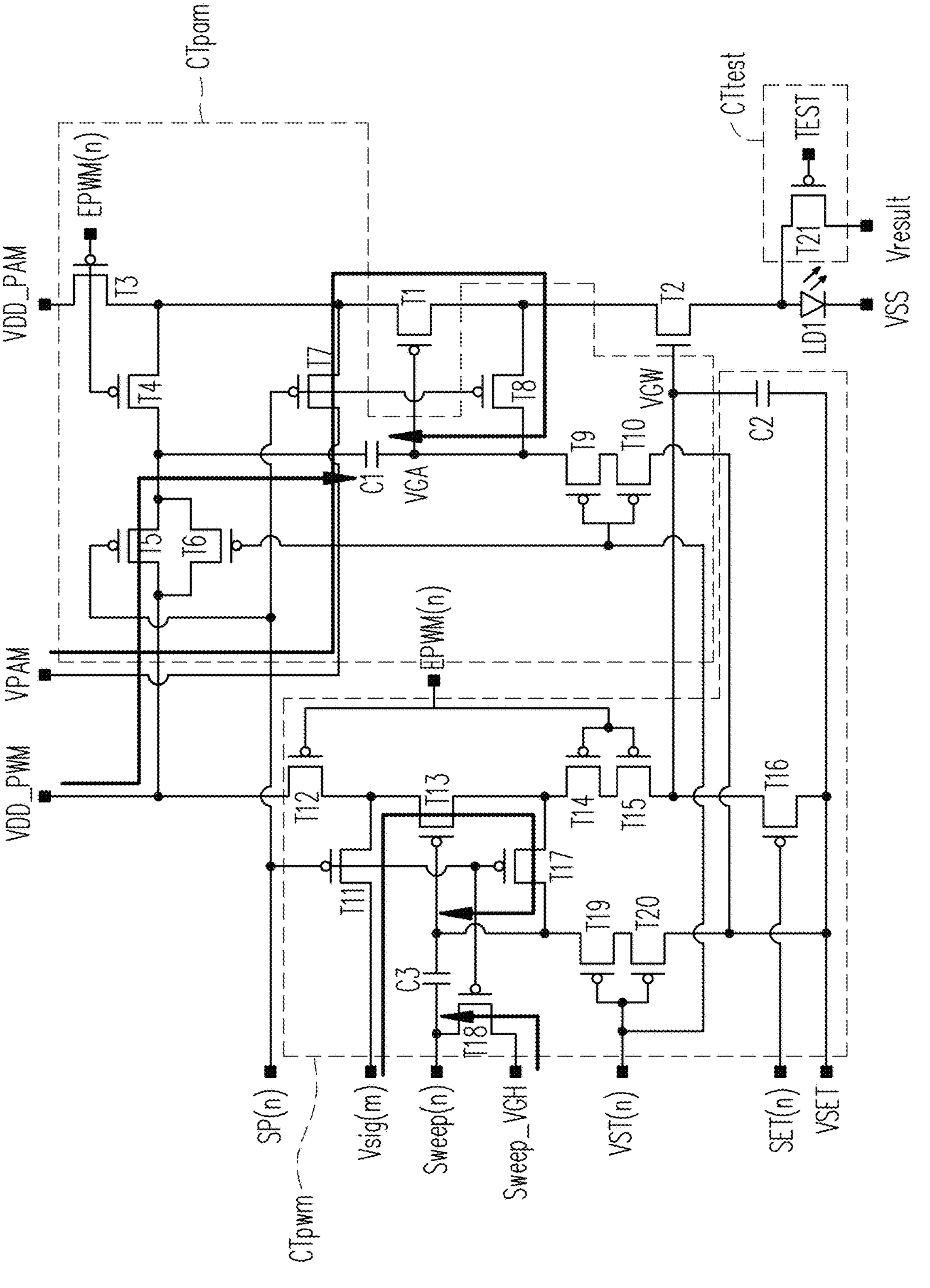
FIG. 3B is a schematic operation diagram of the pixel circuit during a pixel compensation period according to an embodiment of the disclosure.

FIG. 3B is a schematic operation diagram of the pixel circuit during a pixel compensation period according to an embodiment of the disclosure. Referring to FIG. 1A, FIG. 2, and FIG. 3B, during the pixel compensation period Pcp, the pixel setting signal SP(n) is enabled, and the initial voltage signal VST(n), the voltage setting signal SET(n), the emission signal EPWM(n), and the swing signal Sweep(n) are disabled. At this time, the transistors T1, T5, T7, T8, T11, T13, T17, and T18 are turned on, while the remaining transistors are not turned on. As such, the voltage across the capacitor C1 is the system high voltage VDD_PAM minus (the amplitude data voltage VPAM minus a gate-source voltage of the transistor T1), the voltage across the capacitor C2 remains in an uncertain state, and the voltage across the capacitor C3 is the swing high voltage Sweep_VGH minus (the grayscale data voltage Vsig(m) minus a gate-source voltage of the transistor T13).

Figure 3C:
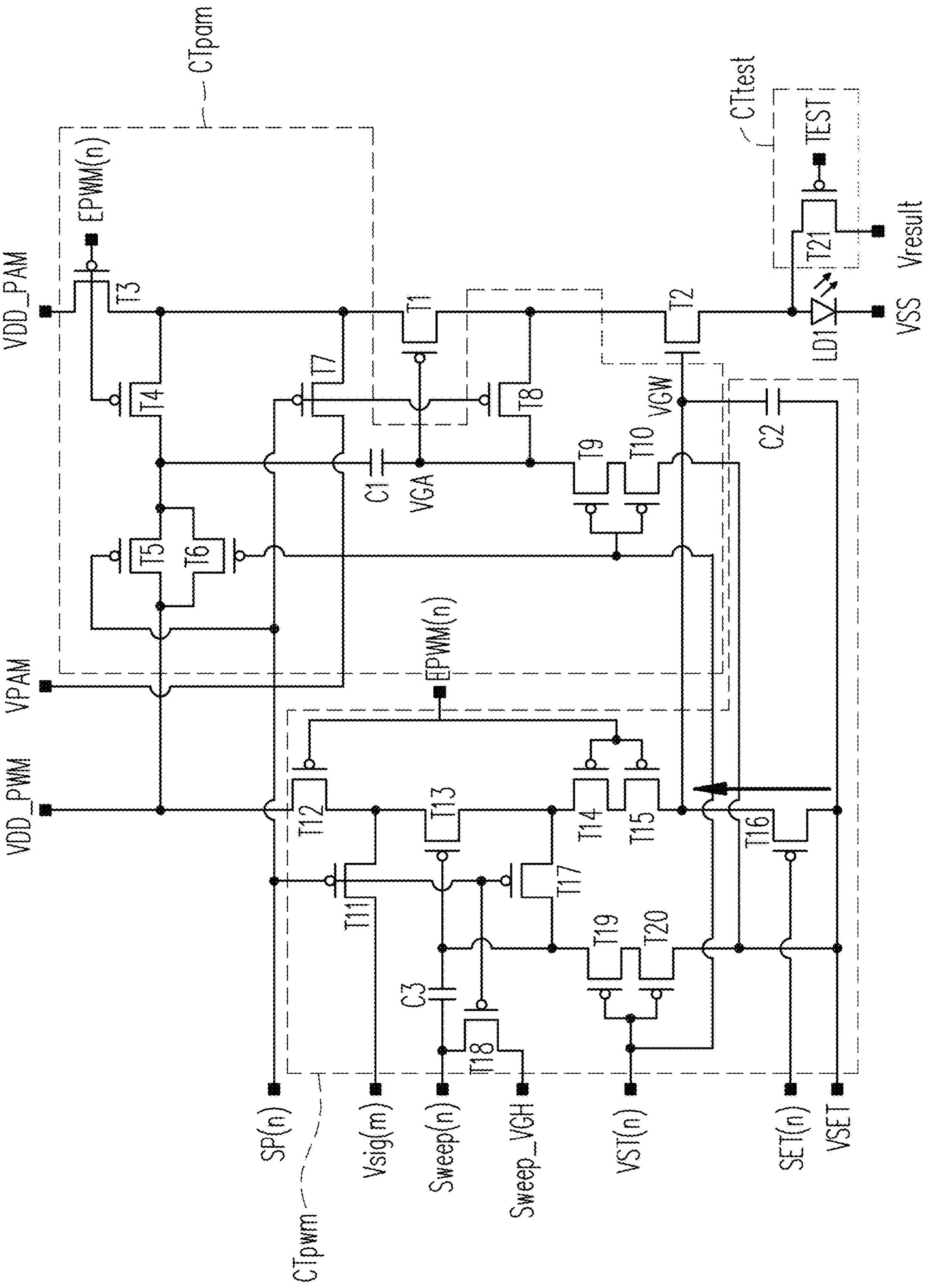
FIG. 3C is a schematic operation diagram of the pixel circuit during an emission reset period according to an embodiment of the disclosure.

FIG. 3C is a schematic operation diagram of the pixel circuit during an emission reset period according to an embodiment of the disclosure. Referring to FIG. 1A, FIG. 2, and FIG. 3C, during the emission reset period EmiReset, the voltage setting signal SET(n) is enabled, and the initial voltage signal VST(n), the pixel setting signal SP(n), the emission signal EPWM(n), and the swing signal Sweep(n) are disabled. At this time, the transistor T16 is turned on, while the remaining transistors are not turned on. As such, the voltage across the capacitor C1 remains as the system high voltage VDD_PAM minus (the amplitude data voltage VPAM minus the gate-source voltage of the transistor T1), the voltage across the capacitor C2 is 0 (i.e., the setting voltage VSET minus the setting voltage VSET), and the voltage across the capacitor C3 remains as the swing high voltage Sweep_VGH minus (the grayscale data voltage Vsig(m) minus the gate-source voltage of the transistor T13).

Figure 3D:
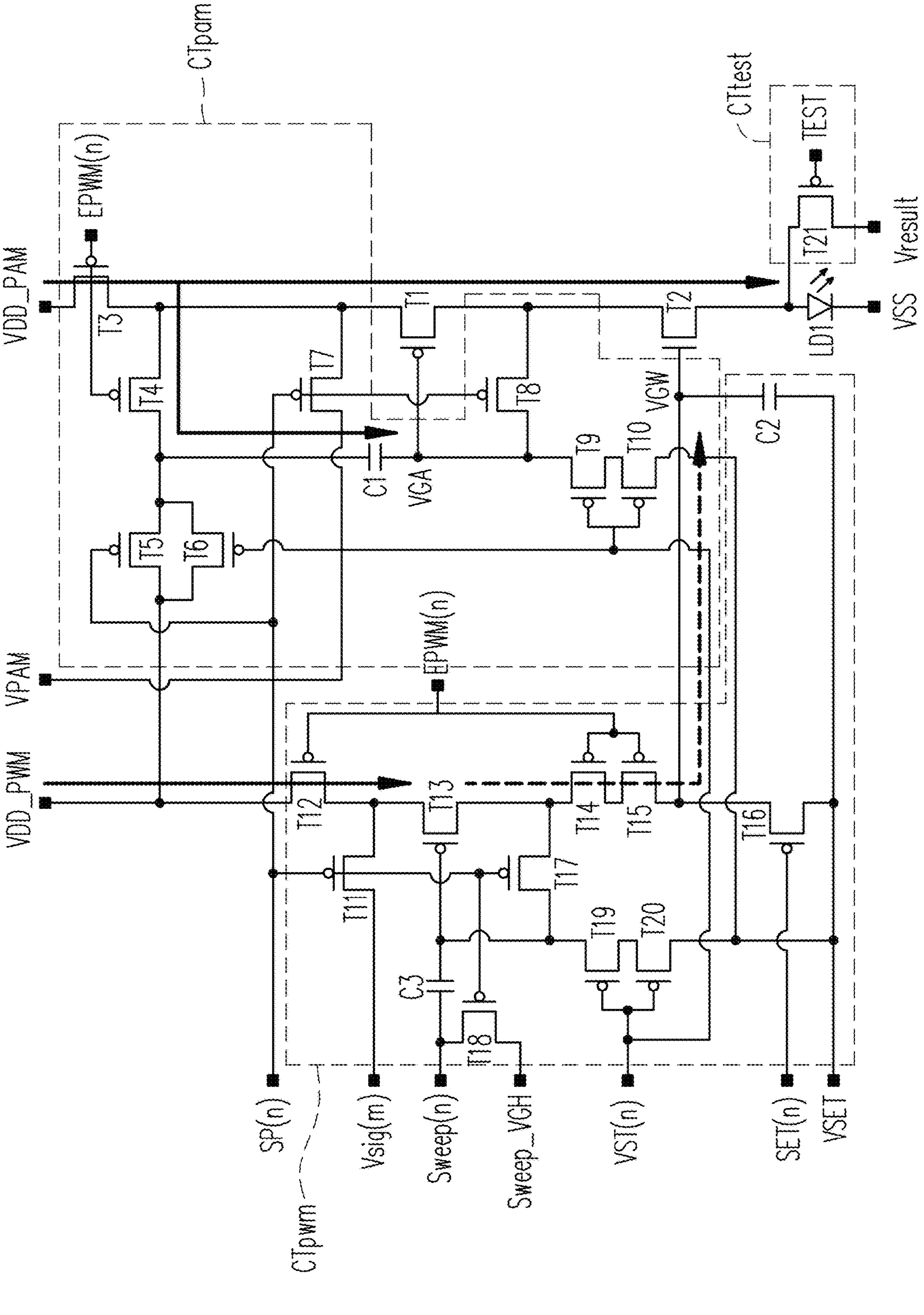
FIG. 3D is a schematic operation diagram of the pixel circuit during an emission driving period according to an embodiment of the disclosure.

FIG. 3D is a schematic operation diagram of the pixel circuit during an emission driving period according to an embodiment of the disclosure. Referring to FIG. 1A, FIG. 2, and FIG. 3D, during the emission driving period Emissiont, the emission signal EPWM(n) is enabled, and the initial voltage signal VST(n), the pixel setting signal SP(n), and the voltage setting signal SET(n) are disabled, and the swing signal Sweep(n) descends from a high voltage level to a low voltage level.

When the swing signal Sweep(n) has not descended to the corresponding voltage level, the transistors T1, T3, T4, T12, T14, and T15 are turned on, while the remaining transistors are not turned on. As such, the voltage across the capacitor C1 remains as the system high voltage VDD_PAM minus (the amplitude data voltage VPAM minus the gate-source voltage of the transistor T1), the voltage across the capacitor C2 is 0, and the voltage across the capacitor C3 remains as the swing high voltage Sweep_VGH minus (the grayscale data voltage Vsig(m) minus the gate-source voltage of the transistor T13), but a gate voltage of the transistor T13 descends corresponding to the swing signal Sweep(n).

When the swing signal Sweep(n) descends to the corresponding voltage level, the transistors T1, T3, T4, T12, T13, T14, and T15 are turned on, while the remaining transistors are not turned on. As such, the voltage across the capacitor C1 remains as the system high voltage VDD_PAM minus (the amplitude data voltage VPAM minus the gate-source voltage of the transistor T1), the voltage across the capacitor C2 rises due to charging by the system high voltage VDD_PWM, and the voltage across capacitor C3 remains as the swing high voltage Sweep_VGH minus (the grayscale data voltage Vsig(m) minus the gate-source voltage of the transistor T13), but the gate voltage of the transistor T13 continues to descend corresponding to the swing signal Sweep(n).

Next, when the voltage across the capacitor C2 rises sufficiently to drive the transistor T2 to be turned on, the transistor T2 may be turned on, so that the light-emitting diode LD1 emits light.

Figure 3E:
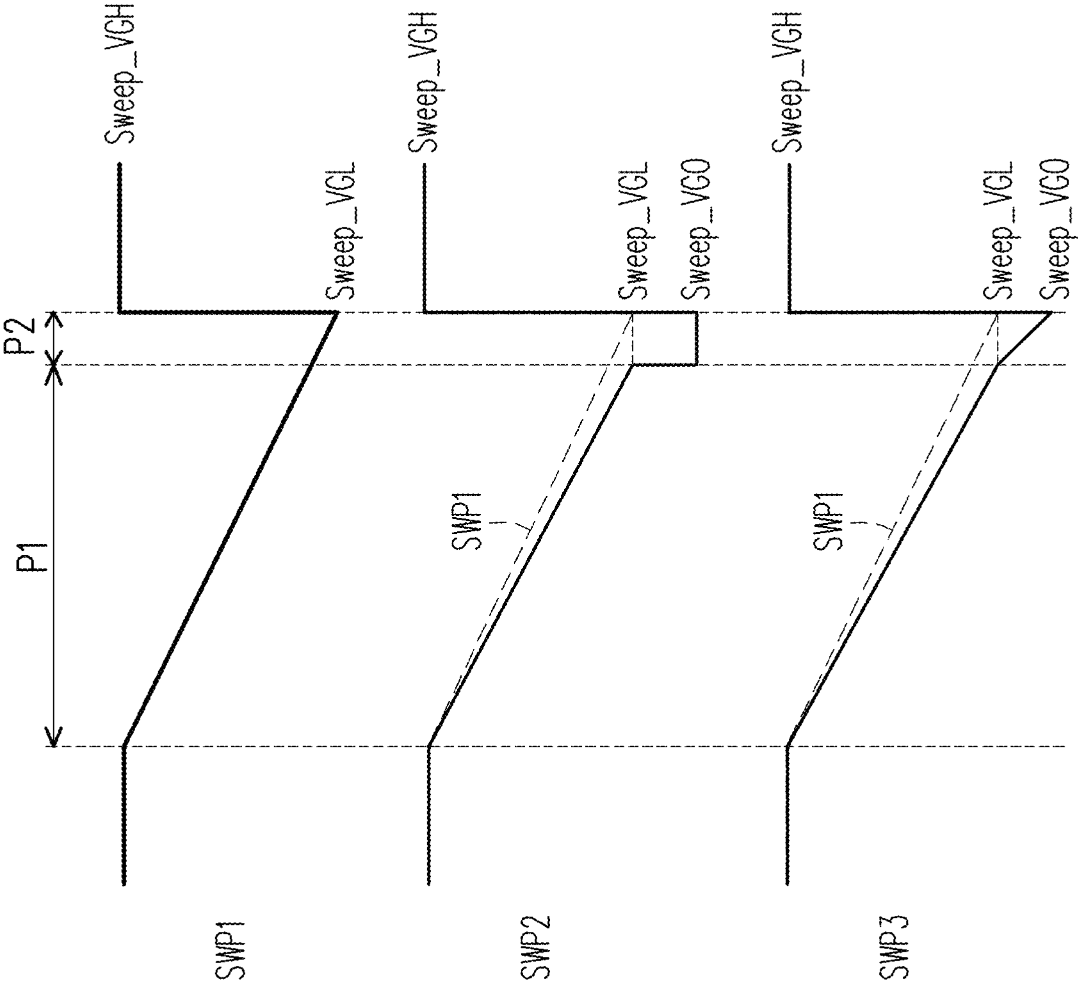
FIG. 3E is a schematic waveform graph of a plurality of driving waveforms of the swing signal of the pixel circuit according to an embodiment of the disclosure.

FIG. 3E is a schematic waveform graph of a plurality of driving waveforms of the swing signal of the pixel circuit according to an embodiment of the disclosure. Referring to FIG. 1A, FIG. 2, and FIG. 3E, during the emission driving period Emissiont, the swing signal Sweep(n) waveform may be one of the waveforms SWP1 to SWP3. Further, when the pixel circuit PX displays a high grayscale brightness, the swing signal Sweep(n) waveform may be the waveform SWP1. Conversely, when the pixel circuit PX displays a low grayscale brightness, the swing signal Sweep(n) waveform may be one of the waveforms SWP2 and SWP3, which may be determined based on circuit design, and the embodiments of the disclosure are not limited thereto.

Further, when the grayscale data voltage Vsig(m) indicates that the pixel circuit PX does not display the low grayscale brightness, the swing signal Sweep(n) linearly moves from the swing high voltage Sweep_VGH toward the swing low voltage Sweep_VGL during a first time period P1 and a second time period P2.

When the grayscale data voltage Vsig(m) indicates that the pixel circuit PX displays the low grayscale brightness, the swing signal Sweep(n) linearly moves from the swing high voltage Sweep_VGH toward the swing low voltage Sweep_VGL with a first slope during the first time period P1. During the second time period P2 after the first time period P1, the swing signal Sweep(n) transitions to a swing overdrive voltage Sweep_VGO that is lower than the swing low voltage Sweep_VGL. The first slope may be determined based on the circuit design, and the embodiments of the disclosure are not limited thereto. As such, since the swing overdrive voltage Sweep_VGO is lower than the swing low voltage Sweep_VGL, that is, the channel of the transistor T13 may be enlarged to accelerate the turning-on speed of the transistor T2, the problem of screen sparkling may be improved without having to increase the current flowing through the light-emitting diode LD1.

As shown in the waveform SWP2, when the grayscale data voltage Vsig(m) indicates that the pixel circuit PX displays the low grayscale brightness, the swing signal Sweep(n) is fixed at the swing overdrive voltage Sweep_VGO throughout the entire second time period P2.

As shown in the waveform SWP3, when the grayscale data voltage Vsig(m) indicates that the pixel circuit PX displays the low grayscale brightness, the swing signal Sweep(n) linearly moves to the swing overdrive voltage Sweep_VGO during the second time period P2 with a second slope different from the first slope. The second slope may be determined based on the circuit design, and the embodiments of the disclosure are not limited thereto.

According to the above, a new driving method and a scan signal for a micro light-emitting diode display based on the pulse width modulation driving is provided, so as to solve the crosstalk problem among pixel circuits and the screen sparkling problem. That is, a normal black display mode is adopted to improve the crosstalk (X-talk) problem, and a multi-level swing signal is provided to improve the sparkling problem in the low grayscale level (LGL). Through the above method, the data range may be maintained and the need for a second set of emission signals is avoided, and further, under the low grayscale level (LGL), the waveforms SWP1 and SWP2 have the same current peak.

In the embodiments of the disclosure, the sum of the time of the first time period P1 and the second time period P2 may be 60 microseconds (μs), and the time length of the first time period P1 may be 2 to 10 microseconds. That is, the time length of the first time period P1 may account for a proportion between 2/60 to 10/60 of the overall time, which may be determined based on the circuit design, and the embodiments of the disclosure are not limited thereto.

In view of the foregoing, in the pixel circuit of the embodiment of the disclosure, the second driving transistor has a channel polarity different from that of the first driving transistor, for example, so that the second driving transistor is turned off first and is turned on only when the width control signal rises to exceed the threshold voltage of the second driving transistor. In this way, the surge generated by the swing signal due to crosstalk does not affect the turning-on time of the second driving transistor, so that the crosstalk problem among pixel circuits when the display panel displays low a grayscale level is improved. Further, when the low grayscale brightness is displayed, the swing signal may be allowed to drop to a swing overdrive voltage lower than the swing low voltage to accelerate the turning-on speed of the second driving transistor. In this way, the screen sparkling problem is improved without increasing the current flowing through the light-emitting diode.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel circuit, comprising:

a light-emitting diode having an anode and a cathode receiving a system low voltage;

a first driving transistor having a first terminal, a control terminal receiving an amplitude control signal, and a second terminal;

a second driving transistor having a first terminal coupled to the second terminal of the first driving transistor, a control terminal receiving a width control signal, and a second terminal coupled to the anode of the light-emitting diode, wherein a channel polarity of the second driving transistor is different from that of the first driving transistor;

a pulse amplitude modulation circuit coupled to the first terminal, the control terminal, and the second terminal of the first driving transistor and receiving a first system high voltage, an emission signal, and an amplitude data voltage, so as to provide the first system high voltage to the first terminal of the first driving transistor based on the emission signal and provide the amplitude control signal based on the emission signal and the amplitude data voltage; and a pulse width modulation circuit coupled to the control terminal of the second driving transistor and receiving a second system high voltage, the emission signal, a swing signal, and a width data voltage, so as to provide the width control signal based on the second system high voltage, the emission signal, the swing signal, and the width data voltage, wherein when the width data voltage indicates that the pixel circuit displays a low grayscale brightness, the swing signal linearly moves from a swing high voltage toward a swing low voltage with a first slope during a first time period, and during a second time period immediately following the first time period, the swing signal transitions to a swing overdrive voltage lower than the swing low voltage, wherein the swing signal is fixed at the swing overdrive voltage throughout the second time period, and immediately returns to the swing high voltage upon expiration of the second time period, and when the width data voltage indicates that the pixel circuit does not display the low grayscale brightness, the swing signal linearly moves from the swing high voltage toward the swing low voltage during the first time period and the second time period.

2. The pixel circuit according to claim 1, wherein the pulse amplitude modulation circuit comprises:

a first transistor having a first terminal receiving the first system high voltage, a control terminal receiving the emission signal, and a second terminal coupled to the first terminal of the first driving transistor;

a second transistor having a first terminal, a control terminal receiving the emission signal, and a second terminal coupled to the first terminal of the first driving transistor;

a third transistor having a first terminal receiving the second system high voltage, a control terminal receiving a pixel setting signal, and a second terminal coupled to the first terminal of the second transistor;

a fourth transistor having a first terminal receiving the second system high voltage, a control terminal receiving an initial voltage signal, and a second terminal coupled to the first terminal of the second transistor;

a fifth transistor having a first terminal receiving the amplitude data voltage, a control terminal receiving the pixel setting signal, and a second terminal coupled to the first terminal of the first driving transistor;

a first capacitor coupled between the first terminal of the second transistor and the control terminal of the first driving transistor and configured to provide the amplitude control signal;

a sixth transistor having a first terminal coupled to the control terminal of the first driving transistor, a control terminal receiving the pixel setting signal, and a second terminal coupled to the second terminal of the first driving transistor;

a seventh transistor having a first terminal coupled to the control terminal of the first driving transistor, a control terminal receiving the pixel setting signal, and a second terminal; and an eighth transistor having a first terminal coupled to the second terminal of the seventh transistor, a control terminal receiving the pixel setting signal, and a second terminal receiving a setting voltage.

3. The pixel circuit according to claim 2, wherein the pulse width modulation circuit comprises:

a second capacitor coupled between the control terminal of the second driving transistor and the setting voltage;

a ninth transistor having a first terminal receiving the width data voltage, a control terminal receiving the pixel setting signal, and a second terminal;

a tenth transistor having a first terminal receiving the second system high voltage, a control terminal receiving the emission signal, and a second terminal coupled to the second terminal of the ninth transistor;

an eleventh transistor having a first terminal coupled to the second terminal of the ninth transistor, a control terminal, and a second terminal;

a third capacitor coupled between the swing signal and the control terminal of the eleventh transistor;

a twelfth transistor having a first terminal coupled to the second terminal of the eleventh transistor, a control terminal receiving the emission signal, and a second terminal;

a thirteenth transistor having a first terminal coupled to the second terminal of the twelfth transistor, a control terminal receiving the emission signal, and a second terminal coupled to the control terminal of the second driving transistor and configured to provide the width control signal;

a fourteenth transistor having a first terminal coupled to the control terminal of the second driving transistor, a control terminal receiving a voltage setting signal, and a second terminal receiving the setting voltage;

a fifteenth transistor having a first terminal coupled to the control terminal of the eleventh transistor, a control terminal receiving the pixel setting signal, and a second terminal coupled to the second terminal of the eleventh transistor;

a sixteenth transistor having a first terminal receiving the swing signal, a control terminal receiving the pixel setting signal, and a second terminal receiving a swing high voltage;

a seventeenth transistor having a first terminal coupled to the control terminal of the eleventh transistor, a control terminal receiving the initial voltage signal, and a second terminal; and an eighteenth transistor having a first terminal coupled to the second terminal of the seventeenth transistor, a control terminal receiving the initial voltage signal, and a second terminal receiving the setting voltage.

4. The pixel circuit according to claim 3, wherein the first driving transistor and the first transistor to the eighteenth transistor are P-type transistors, and the second driving transistor is an N-type transistor.

5. The pixel circuit according to claim 1, further comprising: a test circuit coupled to the anode of the light-emitting diode and receiving a test signal, so as to provide a test result voltage based on the test signal.

6. The pixel circuit according to claim 5, wherein the test circuit comprises:

a nineteenth transistor having a first terminal coupled to the anode of the light-emitting diode, a control terminal receiving the test signal, and a second terminal providing the test result voltage.

7. The pixel circuit according to claim 1, wherein the light-emitting diode is a micro light-emitting diode.

8. A pixel circuit, comprising:

a light-emitting diode having an anode and a cathode receiving a system low voltage;

a first driving transistor controlled to be turned on by an amplitude control signal;

a second driving transistor controlled to be turned on by a width control signal, wherein the first driving transistor and the second driving transistor are coupled in series to the anode of the light-emitting diode, and a channel polarity of the second driving transistor is different from that of the first driving transistor;

a pulse amplitude modulation circuit receiving a first system high voltage, an emission signal, and an amplitude data voltage, so as to provide the first system high voltage to the first driving transistor based on the emission signal and to provide the amplitude control signal based on the emission signal and the amplitude data voltage; and a pulse width modulation circuit receiving a second system high voltage, the emission signal, a swing signal, and a width data voltage, so as to provide the width control signal based on the second system high voltage, the emission signal, the swing signal, and the width data voltage, wherein when the width data voltage indicates that the pixel circuit displays a low grayscale brightness, the swing signal linearly moves from a swing high voltage toward a swing low voltage with a first slope during a first time period, and during a second time period immediately following the first time period, the swing signal transitions to a swing overdrive voltage lower than the swing low voltage, wherein the swing signal is fixed at the swing overdrive voltage throughout the second time period, and immediately returns to the swing high voltage upon expiration of the second time period, and when the width data voltage indicates that the pixel circuit does not display the low grayscale brightness, the swing signal linearly moves from the swing high voltage toward the swing low voltage during the first time period and the second time period.

9. The pixel circuit according to claim 8, wherein the pulse amplitude modulation circuit comprises:

a first transistor having a first terminal receiving the first system high voltage, a control terminal receiving the emission signal, and a second terminal coupled to a first terminal of the first driving transistor;

a second transistor having a first terminal, a control terminal receiving the emission signal, and a second terminal coupled to the first terminal;

a third transistor having a first terminal receiving the second system high voltage, a control terminal receiving a pixel setting signal, and a second terminal coupled to the first terminal of the second transistor;

a fourth transistor having a first terminal receiving the second system high voltage, a control terminal receiving an initial voltage signal, and a second terminal coupled to the first terminal of the second transistor;

a fifth transistor having a first terminal receiving the amplitude data voltage, a control terminal receiving the pixel setting signal, and a second terminal coupled to the first terminal of the first driving transistor;

a first capacitor coupled between the first terminal of the second transistor and a control terminal of the first driving transistor and configured to provide the amplitude control signal;

a sixth transistor having a first terminal coupled to the control terminal of the first driving transistor, a control terminal receiving the pixel setting signal, and a second terminal coupled to a second terminal of the first driving transistor;

a seventh transistor having a first terminal coupled to the control terminal of the first driving transistor, a control terminal receiving the pixel setting signal, and a second terminal; and an eighth transistor having a first terminal coupled to the second terminal of the seventh transistor, a control terminal receiving the pixel setting signal, and a second terminal receiving a setting voltage.

10. The pixel circuit according to claim 9, wherein the pulse width modulation circuit comprises:

a second capacitor coupled between a control terminal of the second driving transistor and the setting voltage;

a ninth transistor having a first terminal receiving the width data voltage, a control terminal receiving the pixel setting signal, and a second terminal;

a tenth transistor having a first terminal receiving the second system high voltage, a control terminal receiving the emission signal, and a second terminal coupled to the second terminal of the ninth transistor;

an eleventh transistor having a first terminal coupled to the second terminal of the ninth transistor, a control terminal, and a second terminal;

a third capacitor coupled between the swing signal and the control terminal of the eleventh transistor;

a twelfth transistor having a first terminal coupled to the second terminal of the eleventh transistor, a control terminal receiving the emission signal, and a second terminal;

a thirteenth transistor having a first terminal coupled to the second terminal of the twelfth transistor, a control terminal receiving the emission signal, and a second terminal coupled to the control terminal of the second driving transistor and configured to provide the width control signal;

a fourteenth transistor having a first terminal coupled to the control terminal of the second driving transistor, a control terminal receiving a voltage setting signal, and a second terminal receiving the setting voltage;

a fifteenth transistor having a first terminal coupled to the control terminal of the eleventh transistor, a control terminal receiving the pixel setting signal, and a second terminal coupled to the second terminal of the eleventh transistor;

a sixteenth transistor having a first terminal receiving the swing signal, a control terminal receiving the pixel setting signal, and a second terminal receiving a swing high voltage;

a seventeenth transistor having a first terminal coupled to the control terminal of the eleventh transistor, a control terminal receiving the initial voltage signal, and a second terminal; and an eighteenth transistor having a first terminal coupled to the second terminal of the seventeenth transistor, a control terminal receiving the initial voltage signal, and a second terminal receiving the setting voltage.

11. The pixel circuit according to claim 10, wherein the first driving transistor and the first transistor to the eighteenth transistor are P-type transistors, and the second driving transistor is an N-type transistor.

12. The pixel circuit according to claim 8, further comprising: a test circuit coupled to the anode of the light-emitting diode and receiving a test signal, so as to provide a test result voltage based on the test signal.

13. The pixel circuit according to claim 12, wherein the test circuit comprises:

a nineteenth transistor having a first terminal coupled to the anode of the light-emitting diode, a control terminal receiving the test signal, and a second terminal providing the test result voltage.

14. The pixel circuit according to claim 8, wherein the light-emitting diode is a micro light-emitting diode.

* * * * *